United States Patent [19]

Herzl et al.

[11] 4,123,940
[45] Nov. 7, 1978

[54] TRANSMISSION SYSTEM FOR VORTEX-SHEDDING FLOWMETER

[75] Inventors: Peter J. Herzl, Morrisville; Robert G. Shaffer, New Britain, both of Pa.

[73] Assignee: Fischer & Porter Company, Warminster, Pa.

[21] Appl. No.: 836,150

[22] Filed: Sep. 23, 1977

[51] Int. Cl.² ............................................. G01F 1/32
[52] U.S. Cl. ............................................... 73/194 VS
[58] Field of Search ............... 73/194 VS, 194 B, 654; 325/45, 344; 331/65; 340/207 R

[56] References Cited

U.S. PATENT DOCUMENTS

| 2,613,347 | 10/1952 | Todd | 340/207 |
| 2,697,594 | 12/1954 | Stanton | 331/65 |
| 2,809,520 | 10/1957 | Richard, Jr. | 73/194 |
| 3,215,900 | 11/1965 | Harvey | 307/233 |
| 3,689,907 | 9/1972 | Guoyardo | 331/65 |
| 3,895,912 | 7/1975 | Naumann | 331/65 |

Primary Examiner—Herbert Goldstein
Attorney, Agent, or Firm—Michael Ebert

[57] ABSTRACT

A transmission system for a vortex-shedding flowmeter adapted to measure the flow rate of fluid passing through a flow tube by generating fluidic oscillations whose frequency varies with flow rate. These oscillations are detected by a sensor/resonator included in the frequency-determining circuit of a carrier oscillator having a predetermined center frequency. The carrier frequency is caused to deviate from the center frequency at a rate depending on the frequency of the fluidic oscillations and to an extent depending on the amplitude of these oscillations to produce an F-M carrier signal which is mixed with a local oscillator signal to produce a negative beat signal having a relatively low frequency. Though the deviation in the carrier frequency produced as a function of fluid flow rate represents a small percentage change, this same deviation as reflected in the beat signal represents a greatly multiplied percentage change and hence gives rise to a significant increase in sensitivity. The beat frequency is applied to an F-M demodulator to yield an output voltage whose frequency is a function of flow rate, this voltage being converted into a varying D-C flow signal that is transmitted over a two-wire line.

14 Claims, 6 Drawing Figures

TRANSMISSION SYSTEM FOR VORTEX-SHEDDING FLOWMETER

BACKGROUND OF INVENTION

This invention relates generally to wire transmission systems for a vortex-type flowmeter, and more particularly to a crystal-controlled, two-wire transmission system of high sensitivity, with optional linearization and totalization.

In a bluff-body type of vortex flowmeter, the vortex-shedding body is mounted within a flow conduit transversely with respect to the flow axis thereof to create fluidic oscillations whose frequency is proportional to flow rate. These fluidic oscillations are picked up by a transducer which yields an electrical signal whose frequency corresponds to the frequency of the oscillations.

In the prior Herzl U.S. Pat. No. 3,948,098, there is disclosed a vortex-shedding flowmeter in which a piezoelectric sensor actuated by vortex-pressure pulses produces an alternating voltage at a frequency corresponding to the pulse frequency. This alternating voltage is processed to produce a corresponding square-wave signal which acts, by way of an electronic switch, to control the charge/discharge action of a set of capacitors. The circuit is so arranged that the average D-C switch current is directly proportional to the frequency of the square-wave signal, and this, in turn, is directly proportional to the frequency of the sensed vortices.

A similar piezoelectric sensor arrangement is disclosed in the Richardson et al. U.S. Pat. No. 3,948,098 in which the piezoelectric signal controls the charge/discharge characteristics of a set of capacitors to produce an average charging current that reflects the frequency of vortex shedding and controls an output amplifier in a feedback arrangement to produce a varying D-C flow signal in a useful range (4 to 20 mAdc) over a two-wire transmission line leading to a remote station.

In the Richardson et al. patent, the opposing electrodes of the piezoelectric sensing element are connected through respective input resistors to the input terminals of an operational amplifier. Since piezoelectric sensors suitable for this arrangement are limited by practical considerations to very small sizes, the capacitance of such sensors is quite low—in the order of a few picofarads (pf). This dictates a very high input impedance for the associated operational amplifier, and the input resistors must therefore be of a very large value (in the megohm range).

As a consequence, the input resistors must have values in excess of one megohm each. Inasmuch as the signal output level is quite low, effective transmission of this signal becomes very difficult, for noise pick-up and stray leakage due to moisture are then difficult to avoid. With still lower operating frequencies or values of crystal capacitance, the impedance rises correspondingly to further aggravate this problem.

In the copending Herzl application Ser. No. 768,414, filed Feb. 14, 1977, there is disclosed a noise-rejecting sensing system for a vortex-type flowmeter which functions effectively within a very broad operating frequency range, the system being responsive to extremely low as well as to high frequencies. The entire disclosure of the Herzl application is incorporated herein by reference.

In the sensing system disclosed in the copending Herzl application, the sensor, which is responsive to the periodic fluidic pulses, takes the form of a resonator element such as a piezoelectric crystal or inductor that is included in the frequency-determining circuit of a relatively high-frequency oscillator. The central carrier frequency of the oscillator is determined by the normal resonance characteristics of the sensor/resonator in the absence of fluidic pulses. The fluidic pulses to which the sensor is responsive act to impose a frequency-modulation component on the oscillator carrier, this component depending on the repetition rate of the pulses which is a function of flow rate. The F-M signal is demodulated to produce an output signal whose frequency is proportional to flow rate. For purposes of transmission, this output signal is changed into an analog voltage which is fed to a voltage to-two wire converter to produce a current at a remote station in a useful range (i.e., 4 to 20mAdc).

The main advantage of a vortex flowmeter in which the sensor for the fluidic oscillations functions as the resonator of an oscillator to frequency-modulate the oscillator carrier as a function of flow rate as distinguished from a direct action sensor of the type disclosed in the Richardson et al. patent, is that it makes possible a very low impedance value. This low impedance value is highly desirable when signal transmission is required and almost completely avoids the leakage and other problems characteristic of prior arrangements.

Moreover, the resonator/sensor system disclosed in the copending Herzl application is operable over a much broader operating frequency range, for F-M works down to D-C detection levels without degradation, so that the very low operating frequencies encountered in large vortex-shedding flowmeters can be handled without difficulty.

The concern of the present invention is with the transmission of signals derived from a vortex-shedding flowmeter of the type disclosed in the prior Herzl U.S. Pat. No. 3,948,098 as well as the above-identified Herzl application wherein the obstacle assembly mounted in the flow tube, which includes a vortex-shedding body, is also provided with a rear section that is cantilevered from this body and is deflectable. This rear section is excited into vibration at a rate corresponding to the frequency of fluidic oscillations. It is these physical vibrations which are detected by the resonator/sensor to produce an F-M signal. This F-M signal is further modified by a signal conditioner to produce a corresponding 4 to 20 mAdc analog signal or to produce a corresponding digital signal which can be transmitted over a great distance to a remote station.

It is important that the relationship existing between the output signal of the flowmeter and the F-M signal be clearly understood. The frequency of the meter signal is a function of the flow rate of the fluid being metered; the higher the signal frequency, the greater the flow rate. But when an F-M carrier is modulated in accordance with fluidic oscillations, the extent to which the carrier is caused to deviate in frequency from its center frequency depends on the amplitude of the modulation component (the vortex meter signal), whereas the rate at which the deviation takes place depends on the frequency of the modulation component. Consequentially, the bandwidth of the F-M signal is effectively determined by the extent to which the rear section of the obstacle assembly is deflected by the fluidic oscillations. By means of an F-M demodulator, the F-M signal is converted into a voltage whose frequency is determined by the rate of deviation from the center frequency of the carrier and whose amplitude is determined by the extent of frequency deviation, thereby recovering the original frequency component (the meter signal).

We shall now consider how these F-M principles are applicable to a vortex flowmeter transmission system in which the modulation component is derived from the vibrating rear section of an obstacle assembly. As pointed out in Herzl U.S. Pat. No. 4,019,384, the deflectable structure is preferably relatively rigid so that the total excursion of the rear section is almost microscopic, even at the highest amplitude of fluid oscillations. In this way, metal fatigue of the supporting cantilever beam is minimized and failures are not experienced even after prolonged operation.

When, therefore, an F-M transmission system of the type disclosed in the copending Herzl application operates in conjunction with a vortex-shedding meter whose rear section is only slightly deflectable even in response to fluidic oscillations of fairly high amplitude, the resultant F-M produced by the carrier oscillator associated with the sensor/resonator exhibits a small percentage deviation. Percentage deviation is determined by the ratio between the deviation frequency times 100 divided by the carrier frequency. Hence with a carrier frequency of 1000 Hz and a deviation of 10 Hz, the percentage deviation is 1%.

Because of the small percentage deviation which occurs with a slightly deflectable rear section in a vortex-shedding flowmeter in an F-M transmission system of the type disclosed in the copending Herzl application, the F-M signal developed by the carrier oscillator is difficult to detect with a standard F-M demodulator.

The operation of a standard F-M demodulator depends on the percentage deviation of the F-M signal being detected; the greater the percentage, the better the detector response. If, therefore, one has a vortex meter with a deflectable section that undergoes a relatively large excursion even with fluidic oscillations of modest amplitude, the resultant F-M signal would exhibit a large percentage change and would present no demodulation problems.

However, in practice, the deflectable section in the interest of a rugged flowmeter design, is made only slightly deflectable, so that with the F-M system disclosed in the copending Herzl application, the percentage change in the F-M signal is inevitably quite small. For example, assuming that the carrier oscillator associated with the sensor/resonator has a center frequency of 66,000 Hz and that a particular flow rate in the meter brings about a 66 Hz deviation from the center frequency, this amounts to a mere 0.11% change and is therefore difficult to detect. One could, of course, enhance the sensitivity of the system by providing a vortex meter of greater deflectability, but this would be at the expense of an effective meter life.

SUMMARY OF INVENTION

In view of the foregoing, the main object of this invention is to provide a low-power system of high sensitivity operable in conjunction with a vortex flowmeter having a deflectable section that is caused to vibrate at a frequency in accordance with fluidic oscillations, the vibrations being picked up by a sensor/resonator associated with a carrier oscillator to produce an F-M signal which can readily be demodulated even when the extent of deflection is extremely small.

More particularly, it is an object of this invention to provide a transmission system of the above type in which the F-M signal whose frequency varies as a function of flow rate is converted into a current that is conveyed over a two-wire line to a remote station, the frequency-to-current converter being highly accurate.

Also an object of the invention is to provide a two-wire transmission system of the above type which incorporates a digital totalizer to determine the total amount of the variable passing through the meter, means also being provided to linearize the reading.

A significant advantage of a transmission system in accordance with the invention is that it makes it possible to operate in conjunction with rugged vortex meter of very limited deflectability and yet produce an F-M signal having a high percentage change which can be detected without difficulty.

Briefly stated, these objects are accomplished in a transmission system for a vortex-type flowmeter adapted to measure the flow rate of fluid passing through a conduit by generating fluidic oscillations. These oscillations are detected by a sensor/resonator included in the frequency-determining circuit of a carrier oscillator having a predetermined center frequency whereby the frequency of the carrier oscillator is caused to deviate from its center frequency at a rate that depends on the frequency of the fluidic oscillations and to an extent that depends on the amplitude of these oscillations to produce a frequency-modulated carrier signal.

The carrier signal is mixed with the signal yielded by a local oscillator whose stable operating frequency is close to that of the carrier center frequency, the mixer yielding a negative beat signal having a relatively low frequency. Though the deviation produced in the carrier frequency as a function of fluid flow rate represents a small percentage change, this same deviation as reflected in the low-frequency beat signal represents a greatly multiplied percentage change and hence gives rise to a significant increase in sensitivity.

The beat frequency signal is applied to an F-M demodulator to produce an output voltage whose frequency is a function of flow rate, which voltage is converted into a varying d-c flow signal that is transmitted over a two-wire line leading to a remote station. Alternatively, the output voltage of varying frequency may be transmitted over the two-wire line to a remote station which supplies operating power to the field equipment.

OUTLINE OF DRAWINGS

For a better understanding of the invention as well as other objects and further features thereof, reference is made to the following detailed description to be read in conjunction with the accompanying drawings, wherein:

FIG. 3 is a schematic diagram of the sensor/resonator and the associated carrier oscillator included in the system shown in FIG. 2;

FIGS. 5 A, B, C and D are pulse-timing diagrams illustrative of the behavior of certain stages in the system.

DESCRIPTION OF INVENTION

First Embodiment

Figure 1:
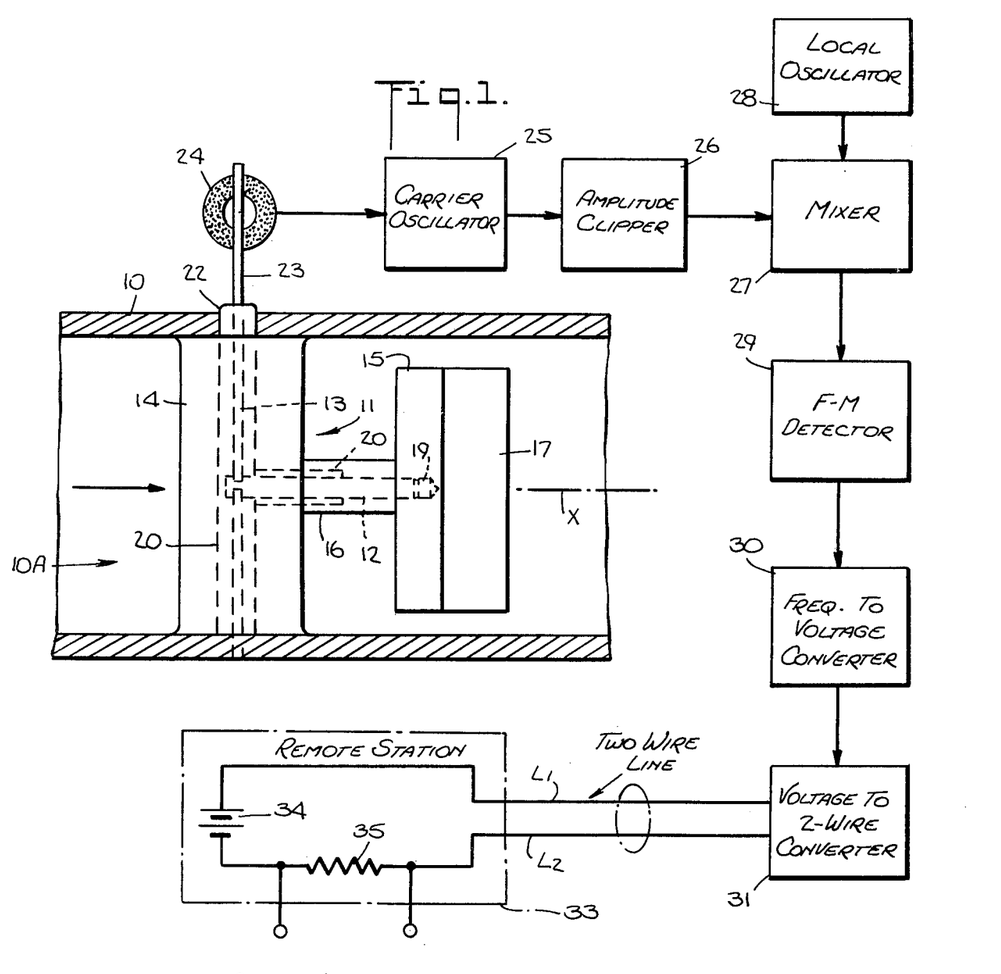
FIG. 1 is a block diagram of a vortex-shedding flowmeter associated with one embodiment of a two-wire transmission system in accordance with the invention.

In the vortex-shedding flowmeter shown in FIG. 1, the fluid to be metered is conducted through a flow tube 10 interposed in a fluid line. For this purpose, flow tube 10 may be provided with mounting flanges to facilitate coupling to the end flanges of the upstream and downstream line pipes. Mounted within flow tube 10 is an obstacle assembly generally designated by numeral 11, the assembly including a deflectable section which is responsive to the Karman vortex street and is caused to vibrate at a frequency which is proportional to flow rate. Incorporated in the obstacle assembly is a vibration linkage composed of a rod 12 and a probe 13.

Flow tube 10 is shown as having a circular cross-section but which may, in other cross-sectional forms, include an inlet 10A into which the fluid to be metered is introduced. The flow impinges on obstacle assembly 11 which acts to divide the flow around the obstacle, producing fluidic perturbations in the form of a Karman vortex street. The nature of this phenomenon is explained in the text by Schlichtling "Boundary Layer Theory" (McGraw-Hill, 1960).

Obstacle assembly 11 is constituted by a transversely-mounted front section 14 and a rear section 15 mounted behind the front section by a cantilever support in the form of a flexible web 16. Extending downstream from rear section 15 is a tail 17. Front section 14 is a contoured block having basically a triangular or delta-shaped cross-section, this axis being perpendicular to the flow axis X of the flow tube. The extremities of the front section are secured to the wall of the tube whereby the front section is held fixedly within the tube. The apex of block 14 faces the incoming fluid, the inclined sides thereof forming leading edges which are swept by the fluid flow to create vortices.

Rear section 15 takes the form of a non-streamlined body having a rectangular cross-section which is maintained by web 16 in spaced relation to the front section, the plane of the rear section being parallel to the flat base of the front section. The rear section shape is such as to interfere with the vortex street, and the gap established between the front section block and the rear section tends to trap the vortices and to strengthen and stabilize the vortex street produced thereby.

Because rear section 15 is cantilevered by means of flexible web 16, it is deflectable. The web, though bendable, has sufficient rigidity so as to permit only a slight deflection of the rear section. As a consequence of the fluidic oscillations produced within the flow tube, the deflectable rear section 15 is excited into vibration at a rate corresponding to the frequency of the oscillations.

The natural resonance of the deflectable rear section is such as to be well outside the normal frequency range of the meter whereby mechanical resonance peaks are absent and the amplitude of the vibrating motion accurately reflects the amplitude of the fluidic oscillations. This vibratory motion is enhanced by tail 17. The downstream section of the assembly carries out two functions; for this section which interferes with the wake not only stabilizes it to enhance its detectability, but its vibratory motion gives rise to the output signal.

Because the deflectable section is relatively rigid, the total excursion of the rear section is minute even at the highest amplitudes of fluidic oscillation, so that metal fatigue of the supporting web, as a result of the vibrating action, is minimized and failures do not arise after prolonged operation.

The minute vibrations of the deflectable rear section of the obstacle assembly are sensed outside of flow tube 10. For this purpose, the vibrations are transmitted by linkage rod 12 whose rear portion is socketed within a bore 19 which extends in a path coincident with flow tube axis X from a point about midway in web 16 to a point at the junction of rear section 15 and tail 17. The front portion of rod 12 lies freely within a relatively large diameter bore 20 communicating with the smaller diameter bore 19 and extending well into front section 14.

The vibrating motion of the rod is transferred to the exterior of the flow tube by probe 13 which is formed of spring material, one end of the probe being anchored in the wall of the flow tube. Probe 13 extends through an internal bore 21 formed in non-deflectable front section 14 along an axis at right angles to tube axis X, the bore registering with a small opening 22 in the wall of the flow tube. The free end of probe 13 protrudes through opening 22 and is joined to a ferromagnetic armature 23, opening 22 covered by a diaphragm 24.

The vibrations of armature 23 are picked up by a sensor/resonator 24 which, in this sample is an inductive element constituted by a pot-type core having a winding thereon which is included in the frequency-determining circuit of a carrier oscillator 25.

The central frequency of the carrier oscillator (i.e., 66,000 Hz) is its normal operating frequency as determined by the inductance of element 24 in the absence of armature vibration. When the armature vibrates back and forth with respect to the inductor core at a rate in accordance with the fluidic oscillations produced within the flow tube, the resultant change in the air gap of the magnetic circuit of the core brings about a corresponding change in the winding inductance, thereby causing the carrier frequency to deviate from the center frequency on either side thereof, whereby the carrier oscillator yields an F-M carrier signal.

Concurrently, the carrier signal is amplitude-modulated, but this A-M component is eliminated by an amplitude clipper 26 having a constant amplitude output. In practice, in lieu of a clipper, one may use an overdriven carrier oscillator.

The inductive type sensor/resonator is not the only form thereof and, as explained in the copending Herzl application, the sensor/resonator may be a piezoelectric element included in the frequency-determining circuit of a crystal-controlled carrier oscillator.

The F-M carrier signal of constant amplitude is applied to one input of a mixer 27 to whose other input is fed the output of a stable local oscillator 28, preferably crystal-controlled. The local oscillator frequency is close to the center frequency of the carrier oscillator, thereby developing a negative beat signal whose frequency is the difference between the carrier center frequency and the local oscillator frequency.

Assuming, therefore, a carrier center frequency of 66,000 Hz and a local oscillator frequency of 60,000 Hz, the resultant negative beat frequency is 6,000 Hz. If then a particular flow rate in the meter produces a 66 Hz deviation from the carrier center frequency, the percentage deviation in the F-M signal applied to the input of the mixer is 0.11%. But after going through the mixer, the 66 Hz deviation results in 1.1% change with respect to the 6,000 Hz beat signal.

Thus in the example cited, the sensitivity of the system is multiplied by a factor of 10. This makes it possible to work successfully with much smaller deflections in the obstacle assembly of the flowmeter and makes feasible a far more rugged meter design.

The output of mixer 27 is fed to a standard F-M detector 29 which extracts the frequency-modulation component from the negative beat frequency to produce an output signal whose frequency corresponds to the vibratory rate of the deflectable section and therefore represents the flow rate of the fluid passing through the meter. In practice, this demodulator may be a low-power integrated circuit unit, such as the RCA model 4046 F-M detector. The resultant signal is converted by a standard frequency-to-voltage converter 30 into an analog voltage which is applied to a suitable voltage-to-two wire converter 31. This converter may be an integrated circuit such as the National Semiconductor LH 0045 unit. Alternatively, as explained in connection with FIG. 6, one need not convert the output signal into an analog voltage, but this signal may be transmitted over the two-wire line.

Converter unit 31 is coupled by a two-wire line 32 to a remote station 33 having a d-c supply 34 connected in series with an output load resistor 35 to produce a current thereacross which varies in accordance with the analog voltage applied to the converter, preferably in the widely-used 4 to 20 mAdc range.

The inductive sensor/resonator system has the same advantages as a piezo-electric sensor/resonator, although the associated carrier oscillator is not as stable, plus some advantages in reliability, cost structure and in temperature range. However, the invention is not limited to inductive frequency-determining elements, and in practice the sensor/resonator may be a capacitative or any other element that can be included in the tank circuit of an oscillator to determine its operating frequency.

While the first embodiment has been described in connection with vortex-type flowmeters, the same transmission system may be used in conjunction with other types of flowmeters such as turbine meters in which a change in flow rate is translated into a change in reactive value by means of a sensor/resonator incorporated in a carrier oscillator to generate an F-M signal.

Second Embodiment

Figure 2:
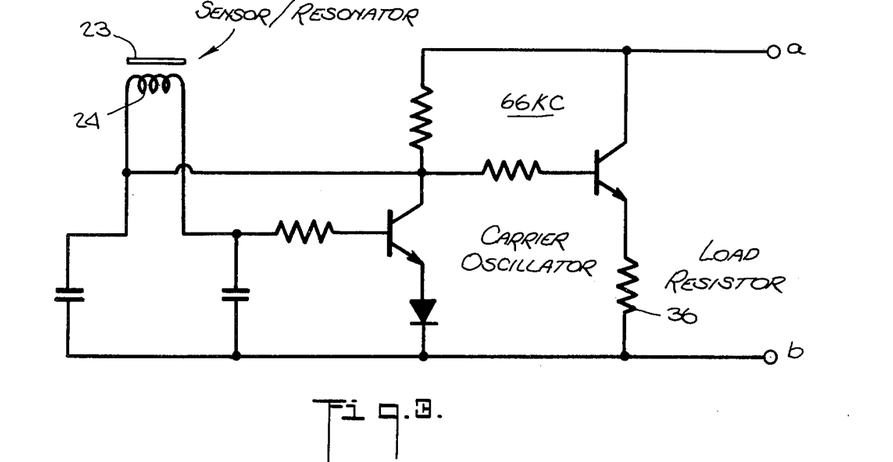
FIG. 2 is a schematic circuit diagram of a second embodiment of a transmission system in accordance with the invention.

Referring now to FIGS. 2 and 3, there is shown a vortex-shedding flowmeter which is identical to that shown in FIG. 1 and whose sensor/resonator 24 is associated with a carrier oscillator 25 to produce an F-M carrier signal. It will again be assumed that the center frequency of the carrier is 66,000 Hz.

Power for the carrier oscillator is supplied thereto over a relatively short two-wire line $a$ (+) and $b$ (−) which serves also to transmit the signal from the meter. To this end, a load resistor 36 connected across the oscillator causes the oscillator to draw sufficient power to superimpose the oscillator frequency on the power supply leads, thereby making possible two-wire transmission to the signal conditioner which may be either primary or remote-mounted.

At the signal conditioner, the negative side of the supply current on line $b$ passes through a parallel L-C resonant network 37 which is sharply tuned to the center frequency of the carrier oscillator. Hence, the impedance of resonant network 37 has its maximum value at the center frequency and falls off as the signal on the line deviates from the center frequency.

Figure 4:
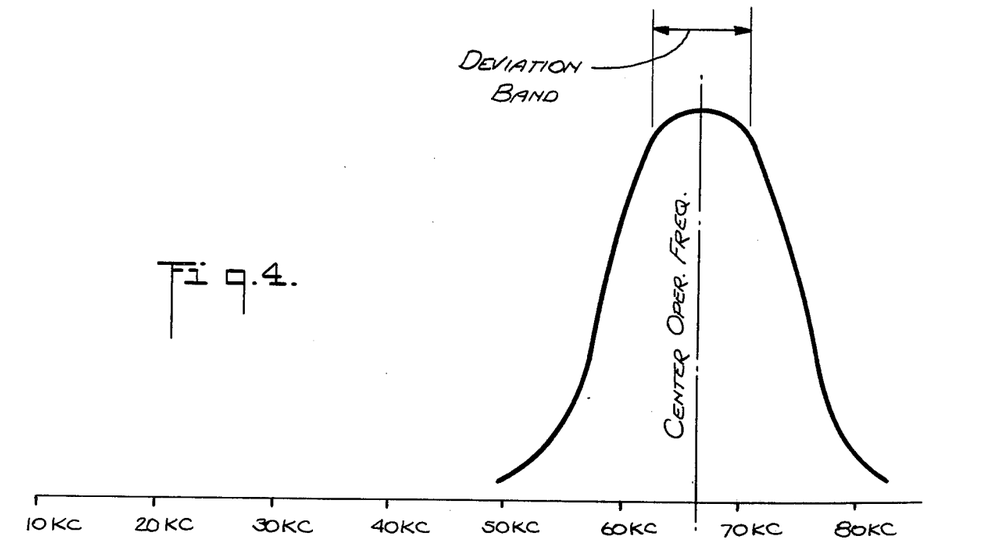
FIG. 4 is a curve showing the relationship between the impedance across an element of the transmission system and the carrier oscillator frequency.

Thus the impedance of network 37, as indicated by the curve in FIG. 4, in which frequency is plotted against impedance, reaches its peak value at the center frequency (66,000 Hz), the impedance remaining high within the deviation band (about 60,000 Hz to 72,000 Hz) and dropping sharply outside this band.

The voltage appearing across tuned network 37 is equal to IZ; where I is the current flowing through the network and Z is the value of network impedance. Since the impedance is only high within the deviation band, noise which is present over a broad spectrum is attenuated at all frequencies other than those lying within the deviation band.

The modulated carrier signal appearing across tuned network 37 is fed through coupling capacitor 38 to the input of an amplifier 39, the output of which is applied to one input of a mixer 40 which preferably takes the form of an Exclusive OR gate. It will be appreciated that various other known forms of mixers may be used for the same purpose.

Applied to the other input of mixer 40 is the output of a crystal-controlled, highly-stable local oscillator 41 whose operating frequency, as in the previous example, is 60,000 Hz. This frequency is subtracted from the carrier center frequency of 66,000 Hz to produce a negative beat frequency of 6,000 Hz. This arrangement, as previously explained, leads to a marked increase in the sensitivity of the system. The output of mixer 40 also yields a positive beat signal representing the sum of the input frequencies. Amplifier 39 and mixer 40 as well as all other stages of the system are supplied with D-C power by the two-wire line.

The beat frequency output of mixer 40 is fed into an F-M detector 41 through a low-pass filter constituted by resistor 42 and capacitor 43. This filter discriminates against the positive beat frequency from the mixer as well as some of the high frequency noise.

F-M detector 41 which in practice may be an RCA integrated circuit unit #4046, demodulates the negative beat signal to yield an output voltage whose frequency varies in accordance with the flow rate of the fluid passing through the vortex meter. Because of the enhanced sensitivity of the system, F-M detector 41 is capable of responding to meter deflections well below one millionth of an inch with acceptable signal-to-noise ratios. It will be appreciated that various types of conventional F-M detectors may be used to effect demodulation.

The low-frequency output voltage in a range, say, from 1 to 1,000 Hz from the F-M detector 41, is applied through a suitable amplifier 44 to a Schmitt trigger 45 that turns this voltage into square wave pulses P whose repetition rate corresponds to the frequency of the output voltage. In some practical applications, these square wave pulses may constitute the system output to provide a reading of flow rate.

To afford protection from possible signal fading which might occur under unfavorable conditions in a vortex shedding flowmeter, pulses P from Schmitt trigger 45 are applied to a phase detector 46 included in an arrangement effecting programmable frequency multiplication and additional signal processing. Phase detector 46 may be an integrated circuit which is the same as the RCA unit 4046 serving as the F-M detector 41.

Phase detector 46 compares the frequency of pulses P, representing meter flow rate, with the output of a counter 47 to produce an output voltage which is fed through a filter formed by a resistor 47 and a capacitor 48 to a voltage-controlled oscillator (VCO) 49 coupled to the input of counter 47. In this way, the output of the phase detector 46 drives the frequency of the VCO up or down to the extent required for the output of counter 47 to become equal to the pulse output frequency of Schmitt trigger 45.

Counter 47 functions effectively to divide the output frequency of VCO 49 by the number set into associated program switches 50. Inasmuch as the output frequency of counter 47 exactly equals the output frequency of Schmitt trigger 45 when a lock or stable condition exists therebetween, the pulse frequency $P_s$ of the VCO 49 appearing at terminal 51 equals the meter frequency times the factor ($n$) set by program switches 50.

This multiplication of the output frequency of the vortex meter is especially important for large meters where the natural frequencies are very low and where it is therefore difficult to obtain adequate resolution and reasonable time constants without frequency multiplication. By the use of program switches 50, it becomes possible to hold the apparent operating frequency range of vortex flowmeters of all sizes to approximately the same span.

The filter formed by resistor 47 and capacitor 48 which applies the voltage from phase detector 46 to VCO 49 has a time constant which prevents the voltage-responsive output frequency generated by the VCO from changing instantaneously. Hence, this filter provides protection against either missing or added pulses, for the effect of such pulses (within certain limits) is not reflected in the VCO output frequency.

The multiplied meter frequency appearing at terminal 51 in the output of VCO 49 is then converted by a frequency-to-current converter into an output signal. Conventional converters of this type usually make use of a capacitor-controlled analog one shot and an integrator. But at the low power levels normally used in a two-wire transmission system, the inaccuracies and temperature instability of such conventional converters are a serious disadvantage and materially degrade the range and accuracy available in vortex-shedding flowmeters.

In the transmission system shown in FIG. 2, instead of an analog one shot, use is made of a digital one shot 52 which counts a given number of cycles generated by the crystal-controlled local oscillator 41 to produce an output at terminal 53 every time a pulse is received. Since local oscillator 41 is extremely stable, timing accuracies of better than 0.1% can be realized at modest cost and maintained over a considerable temperature range.

The output appearing at one shot output terminal 53 is applied to a field effect transistor (FET) 54 which gates current pulses into the differential amplifier 55 of an integrator. The integrator is associated with a voltage regulator 56 and employs classical techniques to change a voltage into a two-wire current output. This arrangement is similar to that employed by National Semiconductor Corporation in their model LH 0045/LH0045-C two-wire transmitter which is described in their instruction bulletin covering this unit. Voltage regulator 56 in the present arrangement is comparable to regulator Al in the National Semiconductor unit, integrator 55 in the present arrangement being comparable to integrator A2 in said unit.

There are, however, several significant distinctions between the present arrangement and those dictated by prior approaches. While there are obvious advantages in using integrated circuits wherever possible, commercially-available ICs, for the most part, have voltage ratings not exceeding 40 volts, with the exception of a few premium-priced units and high cost hybrids, such as the National Semiconductor LH 0045, which offer 50-volt ratings.

For reliable operations of a two-wire transmission system on 49 volts and 25 volts, both of which are commonly used, a minimum voltage rating of about 70 volts would be desirable to afford an adequate safety factor. Hence with prior transmission systems, one could not safely use integrated circuits of the type commercially available. The circuit layout illustrated in FIG. 2 retains the advantages to be gained from low-cost, low-voltage integrated circuits, these being used in combination with a few high-voltage, low-cost discrete components. These discrete components are transistors 57 and 58 in the two-wire driver connected to the output of integrator 55, a transistor 59 associated with voltage regulator 56 and a constant-current diode 60 (an IN 5297) which has a standard 100-volt rating. These discrete transistors are available commercially at low cost with equivalent high voltage ratings. In the present arrangement, it is only these discrete elements that are subjected to the relatively high supply voltage on the two-wire line, the remaining integrated circuits working at 6.8 volts or 5 volts, well below their voltage ratings.

In the copending application of Herzl and Shaffer, Ser. No. 729,779, entitled "Two-Wire Transmitter with Totalizing Counter," the disclosure of which is incorporated herein by reference, a totalizer is provided operating in conjunction with means to produce count pulses whose number depends on the flow rate variable being measured, the pulses being registered by a digital counter. In this prior arrangement, a normally non-conductive transistor is connected between the digital counter and the power source. This transistor is activated by a control pulse produced by an analog one-shot responsive to the count pulses.

In the present arrangement, which is similar to that in the copending Herzl and Shaffer application, the analog one-shot is replaced by a digital one-shot 61 whose output controls a normally non-conductive transistor 62 connected in series with an electromagnetic totalizer counter 63. The digital one-shot allows for very accurate pulse width control, and the pulse width can therefore be set much closer to the minimum pulse width required by the counter. The narrower pulse width conserves energy, and this allows more frequent operation of the counter.

In the copending Herzl and Shaffer application, the totalizing counter is powered by energy derived from make-up current in a manner whereby the output of the transmitter is substantially unaffected by the operation of the totalizer. Similarly, in the present arrangement some of the energy passing through transistor 58 coupled to the output of integrator 55 is stored and then exploited to periodically actuate counter 63.

To store this energy, a storage capacitor 64 is interposed in the output circuit of transistor 58, the capacitor being shunted by a Zener diode 65. In operation, the make-up current flowing through transistor 58 acts to charge capacitor 64 until the charge thereacross reaches a predetermined value, at which point Zener diode 65 is render conductive and the make-up current then passes through this diode. The voltage across storage capacitor 64 is impressed across electromagnetic counter 63 in series with a switching transistor 62 that is normally non-conductive.

The digital one-shot 61 is activated by output pulses emerging from the divide by-n counter 66 which is responsive to pulses $P_s$ derived from output terminal 51. The number of pulses $P_s$ is a multiple of the pulses P produced by Schmitt trigger 45, these pulses being proportional to the metered flow rate, whereas pulses $P_n$ from counter 66 have a number which is an exact submultiple of the number of pulses $P_s$, depending on the selected setting of the divide-by-n counter.

To give a practical example, if a flow of 100 gallons of liquid through the vortex-shedding meter produces 1400 pulses $P_s$ at terminal 51 and one wishes to totalize flow in steps of 100 gallons, then divide-by-n counter 66 is set to divide by 1400. As a consequence, one pulse $P_n$ is yielded by counter 66 for every 1400 $P_s$ pulses. Each $P_n$ results in a single activation of the one-shot device 61 to actuate totalizing counter 63. Hence when this counter reads, say, 30, it means that a total of 3000 gallons has flowed through the meter, each count representing 100 gallons of liquid.

In the prior Herzl U.S. Pat. No. 4,019,384, there is disclosed a vortex meter system in which a trigger produces pulses at a repetition rate proportional to the flow rate, the pulses being applied to a pulse counter whose output is fed to a digital indicator. To correct for errors in linearity, the Herzl patent includes means to interrupt the flow of pulses to the counter to subtract pulses from the count to an extent sufficient to improve the linearity of the meter. This correction is effected by a throw-away counter which closes a gate interposed between the trigger and the pulse counter and holds the gate closed for a predetermined number of pulses.

In the present invention, the digital linearity correction is effected in a similar manner, but the approach is superior for linearizing a 4 to 20 mAdc output. The essential function of the throw-away counter remains the same, only the execution being modified. The problem solved by the present arrangement is that caused by the large disturbance generated in the current output when a pulse is thrown away to effect a correction of linearity. This is especially severe in large meters where the meter frequencies are low.

Figure 5:
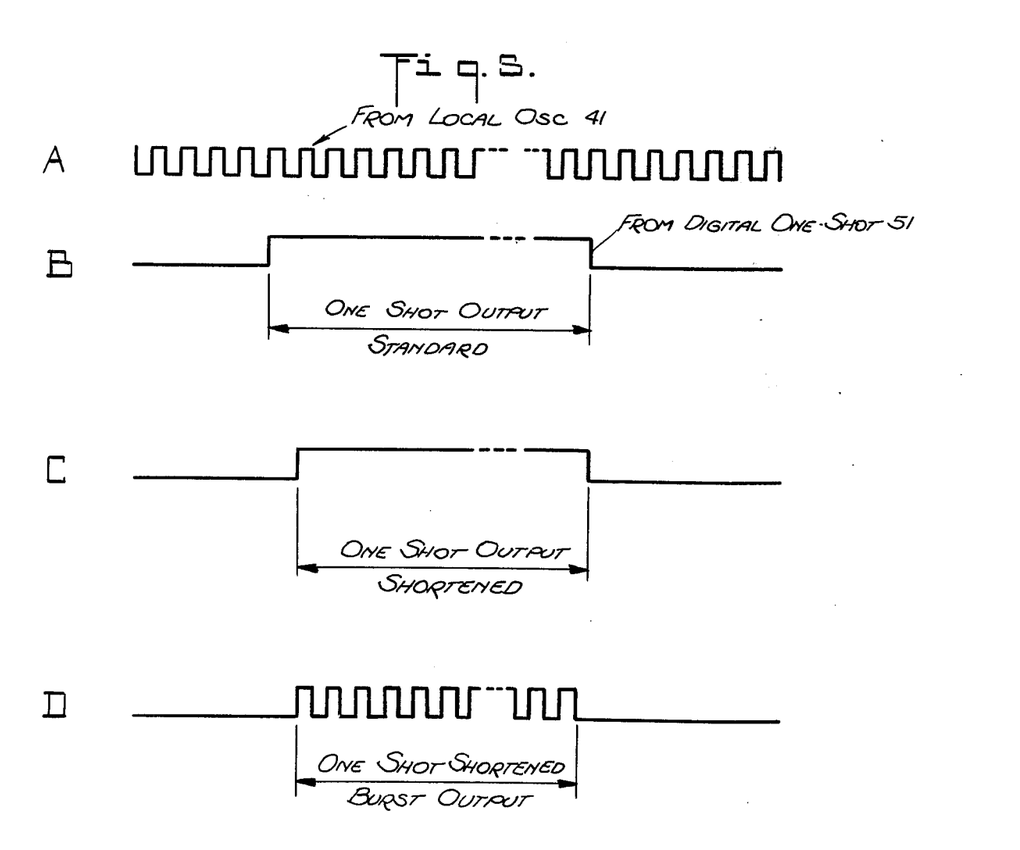

The present system solves this problem in the following manner: The train of pulses shown in FIG. 5A represents the cyclical output of local oscillator 41. The pulse width of digital one-shot 52 is normally determined by counting a fixed number of cycles generated by the local oscillator, as shown in FIG. 3B. We shall, as an example, assume that the normal pulse width of the one-shot is equivalent to 50 cycles of the local oscillator. Let us further assume that the minimum frequency of the meter is 2 Hz and a 1% correction is required at this frequency.

The output of integrator 55 is determined by the pulse frequency and pulse width of the pulses received from output terminal 53 of the digital one-shot 52. If once per second we throw away one pulse of those pulses which make up the pulse width of one-shot 52, we then generate the narrower one-shot output pulse shown in FIG. 2C.

We would now generate one pulse having a width equal to 49 cycles of the local oscillator output and one pulse having a width equal to 50 cycles of the local oscillator output, thereby effecting a 1% correction. By setting switches 67 on the digital linearity correction stage 68 associated with the digital one-shot 52, the amount of pulses and the time period at which they are deducted from the pulse width may be selected. The local oscillator 41 whose output is also fed to the digital linearity correction stage is used to set the time interval.

In the linearization arrangement shown in the prior Herzl patent, one complete pulse would have to be dropped every 50 seconds at 2 Hz to effect a 1% correction. It will be recognized, therefore, that the disturbance to the 4 to 20 mAdc output has been greatly reduced by the present invention (in the case given—by a factor of 50). Counter 69 coupled to terminal 70 of the digital one-shot divides the burst output from the local oscillator, as shown in FIG. 3D, by 50 to return to a corrected digital frequency.

Two-Wire Transmission

Figure 6:
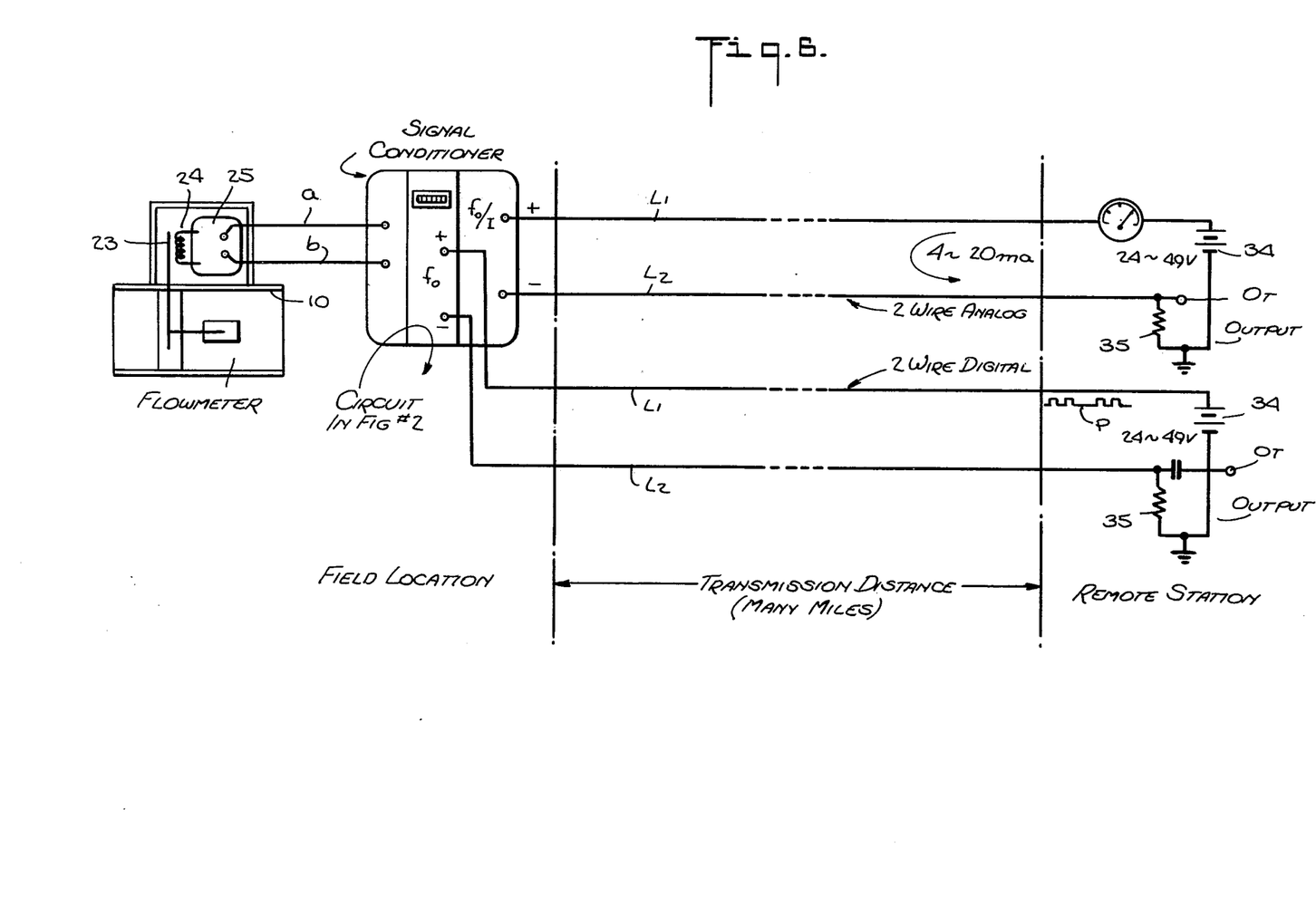
FIG. 6 is a schematic diagram which illustrates how the signal conditioner associated with the flowmeter operates to transmit either an analog or a digital signal over a two-wire transmission line to a remote station.

Referring now to FIG. 6, the relationship of the flowmeter to the signal conditioner and the manner in which an analog or digital signal generated by the conditioner may be transmitted to a remote station will now be explained.

The vortex-type flowmeter produces fluidic oscillations which are sensed by sensor/resonator 24 associated with carrier oscillator 25 to generate an F-M carrier signal. The sensor/resonator 24 and carrier oscillator 25 are mounted above the flowmeter body and the F-M output of oscillator 25 is fed over two-wire line $a$, $b$, to the signal conditioner. This conditioner is constituted by the circuit shown in FIG. 2, wherein Schmitt trigger 45 yields square-wave pulses P whose repetition rate corresponds to the frequency $f_o$ of the fluidic oscillations and is therefore an index to the metered flow rate.

As pointed out in connection with FIG. 2, these squarewave pulses may represent the system output to be transmitted. In order to provide a flow rate reading at a remote station, pulses P are transmitted over the two-wire line $L_1$, $L_2$ to the remote station which includes d-c source 34 and load resistor 35, the pulses developed across this resistor being fed to an output terminal OT through a d-c blocking capacitor C which separates the signal from the d-c current carried on the line. Line $L_1$, $L_2$ which carries the signal pulses also supplies operating power from source 34 at the remote station to the signal conditioner, which in turn supplies the operating power to carrier oscillator 25 over two-wire line $a$, $b$.

The flowmeter and the carrier oscillator 25 associated therewith are located in the field at the pipe line whose flow is being metered, whereas the signal conditioner which is also at the field installation is preferably away from the pipe line in order to isolate the signal conditioner from shock waves and other mechanical forces encountered in industrial process piping. The length of two-wire line $a$, $b$ which connects oscillator 25 at the pipe line with the signal conditioner is therefore relatively short and, in practice, is usually no more than 150 feet in length. On the other hand, the long-distance two-wire transmission line $L_1$, $L_2$ between the field-located signal conditioner and the remote station may be several miles in length.

Alternatively, transmission from the signal conditioner to the remote station may be in analog signal form, in which event pulses P from the Schmitt trigger in FIG. 2 are converted into a 4 to 20 mAdc current by the means disclosed in connection with this figure. This analog signal fo/I is carried by the long transmission line $L_1$ and $L_2$ to the remote station to provide an output at terminal OT. In this situation, a blocking capacitor is not called for.

While there have been shown and described preferred embodiments of a transmission system for vortex-shedding flowmeter in accordance with the invention, it will be appreciated that many changes and modifications may be made therein without, however, departing from the essential spirit thereof.

While there have been shown and described preferred embodiments of a transmission system for vortex-shedding flowmeter in accordance with the invention, it will be appreciated that many changes and modifications may be made therein without, however, departing from the essential spirit thereof.

We claim:

1. A transmission system operable in conjunction with a flowmeter which generates fluidic oscillations whose frequency is an index to the flow rate of the fluid being metered, said system comprising:
    A. a sensor responsive to said fluidic oscillations, said sensor being constituted by a resonator element included in the frequency-determining circuit of a carrier oscillator, said oscillator having a predetermined center frequency in the absence of said fluidic oscillations whereby the frequency of the carrier is caused to deviate from its center frequency at a rate which depends on the frequency of the oscillations and to an extent that depends on the amplitude of the oscillations to produce a frequency-modulated carrier, said flowmeter being of the vortex-shedding type and having a deflectable member which is caused by said fluidic oscillations to vibrate at the same frequency, said sensor being operatively coupled to said deflectable member to vary the value of said resonator element accordingly, said deflectable element being only slightly deflectable, whereby the percentage change in the frequency-modulated carrier is relatively small;
    B. a stable oscillator producing local oscillations whose frequency is close to that of said center frequency;
    C. means to mix said local oscillations with said frequency-modulated carrier to produce a frequency-modulated negative beat signal whose percentage change is much greater than that of said frequency-modulated carrier, thereby significantly increasing the sensitivity of the system; and
    D. means to demodulate said beat signal to derive therefrom an output voltage whose frequency varies as a function of said flow rate.

2. A system as set forth in claim 1, further including means to convert said output voltage into a varying D-C flow signal for transmission over a two-wire line.

3. A system as set forth in claim 1, wherein said deflectable member is mechanically linked to a ferromagnetic armature that is caused to vibrate in synchronism with said member, said sensor being constituted by an inductor adjacent said armature whose inductance is caused to vary in synchronism with said vibrating armature.

4. A system as set forth in claim 1, wherein said carrier oscillator is connected to a two-wire transmission line which supplies operating power thereto, a load resistor being connected across said oscillator to cause it to draw current to an extent imposing the frequency-modulated carrier on said line.

5. A system as set forth in claim 4, further including a resonant network in series with said line tuned to said center-carrier frequency, the network impedance being greatest at said center frequency to develop a voltage thereacross corresponding to said frequency-modulated carrier, and means to apply said voltage to an amplifier whose output is connected to one input of said mixing means.

6. A system as set forth in claim 1, wherein said mixing means is an Exclusive OR gate.

7. A system as set forth in claim 1, wherein said stable oscillator is crystal-controlled.

8. A system as set forth in claim 1, wherein the output voltage is applied to a Schmitt trigger to produce output pulses at a repetition rate which is proportional to the meter flow rate.

9. A system as set forth in claim 8, further including means to multiply the pulse rate of the output pulses produced by said Schmitt trigger to improve the resolution of the system.

10. A system as set forth in claim 9, wherein said multiplying means includes a phase detector which compares the output of a counter with that of said Schmitt trigger to produce a control voltage which governs the operation of a voltage-controlled oscillator whose output is counted by said counter.

11. A system as set forth in claim 10, wherein said control voltage is applied to said voltage-controlled oscillator through a resistance-capacitance filter to render this oscillator insensitive to missing pulses from said Schmitt trigger.

12. A system as set forth in claim 11, further including totalizing means.

13. A system as set forth in claim 12, wherein said totalizing means includes a digital one-shot which is activated by pulses which are a sub-multiple of the pulse rate reflecting the flow-rate, said one-shot actuating a totalizing counter.

14. A system as set forth in claim 1, further including means to convert said output voltage into pulses whose repetition rate is proportional to the frequency of said output voltage and means to transmit said pulses over a two-wire line to a remote station.

* * * * *